US012633113B2

(12) United States Patent
Yamamoto et al.

(10) Patent No.: US 12,633,113 B2
(45) Date of Patent: May 19, 2026

(54) IMAGE PROCESSING DEVICE

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventors: Sakon Yamamoto, Nisshin (JP); Tetsuro Takizawa, Nisshin (JP)

(73) Assignees: DENSO CORPORATION, Kariya-city (JP); TOYOTA JIDOSHA KABUSHIKI KAISHA, Toyota-shi (JP); MIRISE Technologies Corporation, Nisshin-shi (JP)

( * ) Notice: Subject to any disclaimer, the term of this patent is extended or adjusted under 35 U.S.C. 154(b) by 224 days.

(21) Appl. No.: 18/435,428

(22) Filed: Feb. 7, 2024

(65) Prior Publication Data

US 2024/0412504 A1 Dec. 12, 2024

(30) Foreign Application Priority Data

Mar. 28, 2023 (JP) ................................. 2023-050747

(51) Int. Cl.
*G06V 10/94* (2022.01)
*G06V 10/56* (2022.01)
*G06V 10/82* (2022.01)

(52) U.S. Cl.
CPC ............ *G06V 10/955* (2022.01); *G06V 10/56* (2022.01); *G06V 10/82* (2022.01)

(58) Field of Classification Search
CPC ....... G06V 10/955; G06V 10/56; G06V 10/82

USPC .......................................................... 382/104
See application file for complete search history.

(56) References Cited

U.S. PATENT DOCUMENTS

| | | | | |
|---|---|---|---|---|
| 10,182,225 B1 * | 1/2019 | Cui | | G06V 10/30 |
| 11,508,049 B2 * | 11/2022 | Seo | | G06N 3/045 |
| 11,644,834 B2 * | 5/2023 | Ditty | | G05D 1/0088 |
| | | | | 701/23 |
| 11,972,613 B1 * | 4/2024 | Ho | | H04N 5/33 |
| 11,978,181 B1 * | 5/2024 | Pieper | | H04N 23/617 |
| 12,096,533 B1 * | 9/2024 | Felisa | | G06V 20/56 |
| 2014/0232872 A1 * | 8/2014 | Kussel | | H04N 23/80 |
| | | | | 348/148 |
| 2017/0293808 A1 * | 10/2017 | Jain | | G06V 30/19173 |
| 2021/0390353 A1 | 12/2021 | Futatsugi et al. | | |

(Continued)

FOREIGN PATENT DOCUMENTS

| | | |
|---|---|---|
| JP | 2003-162795 A | 6/2003 |
| JP | 2018-041209 A | 3/2018 |
| JP | 2018-157444 A | 10/2018 |

(Continued)

*Primary Examiner* — Stephen R Koziol
(74) *Attorney, Agent, or Firm* — Posz Law Group, PLC

(57) ABSTRACT

An imaging unit images a target object and generating an image including the target object. An element acquisition unit acquires a numerical value representing an intensity of an element of an environment around the vehicle. First and second image processors perform arithmetic processing on the image using first and second neural network models, respectively. A process selection unit selects one of the first and second image processors, which performs arithmetic processing on the image, based on a numerical value representing the intensity of the element as acquired.

9 Claims, 8 Drawing Sheets

(56)                    References Cited

U.S. PATENT DOCUMENTS

| | | | |
|---|---|---|---|
| 2022/0041185 A1* | 2/2022 | Radha .............. | B60W 60/0015 |
| 2023/0219488 A1* | 7/2023 | Hsu ......................... | B60Q 1/12 |

FOREIGN PATENT DOCUMENTS

| | | |
|---|---|---|
| JP | 2019-029830 A | 2/2019 |
| JP | 2021-052350 A | 4/2021 |

* cited by examiner

IMAGE PROCESSING DEVICE

CROSS REFERENCE TO RELATED APPLICATION

The present application is based on Japanese Patent Application No. 2023-050747 filed on Mar. 28, 2023, the disclosures of which is incorporated herein by reference.

TECHNICAL FIELD

The present disclosure relates to an image processing device.

BACKGROUND

Conventionally, an image processing device has been used to recognize an image of an environment.

SUMMARY

According to an aspect of the present disclosure, an image processing device is for a vehicle. The image processing device comprises an imaging unit configured to image a target object and generate an image including the target object, and at least one element acquisition unit configured to acquire a numerical value representing an intensity of at least one element of an environment around the vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
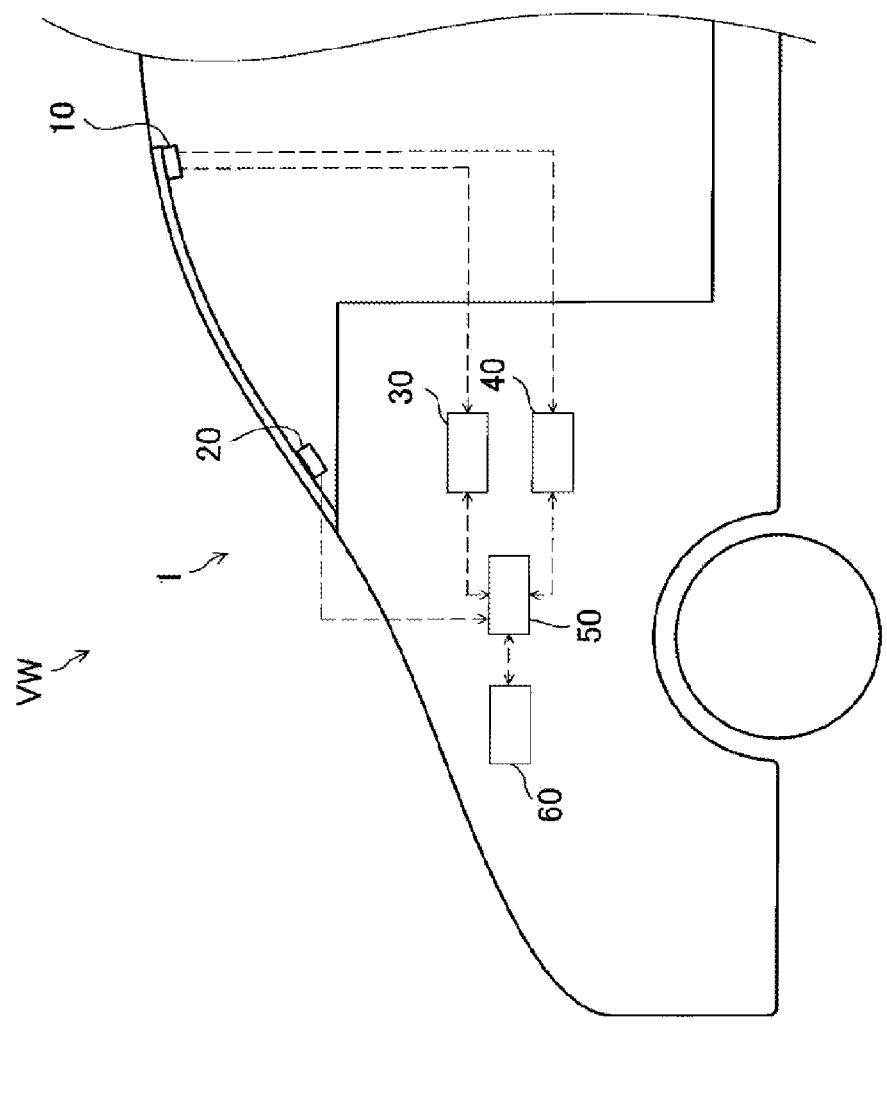
FIG. 1 is a diagram of a configuration of a vehicle according to a present embodiment.

Hereinafter, examples of the present disclosure will be described.

According to an example of the present disclosure, an image recording device automatically switches and records, when the weather is stormy, a captured image at a higher frame rate than the frame rate set for other weather, i.e., when the weather is not stormy. The image recording device is a drive recorder and is installed in a vehicle. In this image recording device, a stormy weather determination processor determines whether or not it is a stormy weather based on the captured image captured by an imaging unit. Specifically, a wiper detection unit extracts a rectangular area surrounding a wiper from the captured image. Extraction of a rectangular area is realized by using an object detection algorithm such as SSD, YOLO or the like.

A wiper operation cycle estimation unit estimates a wiper operation cycle by referring to (a) data of a wiper area supplied from the wiper detection unit and (b) data of a plurality of past wiper areas. Then, a stormy weather determination unit determines that it is a stormy weather when the wiper operation cycle is less than a threshold value. Then, a frame rate switching unit changes the frame rate. In such manner, it is possible to minimize an amount of recorded data of the image recording device while preventing loss of recorded data about dangerous scenes.

In general, for advanced driving support systems, a technique that uses a neural network to detect objects around a vehicle is sometimes used. However, in image processing using a neural network, it is known that the processing accuracy decreases due to external disturbances such as rain, changes in brightness and the like. In order to achieve highly accurate image processing, it is necessary to accumulate image data when a disturbance has occurred and to have time to perform machine learning, which put a heavy burden on those who perform such work. Here, it is known that, depending on the type of neural network, the accuracy of neural networks decreases in different manners when subjected to various disturbances. Therefore, the inventor of the present application considered realizing highly accurate image processing by selecting a neural network according to the type of disturbance occurring in the image.

According to an example of the present disclosure, an image processing device is for a vehicle. The image processing device comprises:

an imaging unit configured to image a target object and generate an image including the target object;

at least one element acquisition unit configured to acquire a numerical value representing an intensity of at least one element of an environment around the vehicle;

a first image processor configured to perform arithmetic processing on the image using a first neural network model;

a second image processor configured to perform arithmetic processing on the image using a second neural network model; and a process selection unit configured to select one of the first image processor and the second image processor, which performs the arithmetic processing on the image.

In a first range of the intensity of the at least one element, an accuracy of the first image processor is higher than an accuracy of the second image processor. In a second range of the intensity of the at least one element, which is lower than the first range in the intensity, the accuracy of the second image processor is higher than the accuracy of the first image processor. The process selection unit is configured to select one of the first image processor and the second image processor, which performs the arithmetic processing, based on the numerical value representing the intensity of the at least one element acquired by the at least one element acquisition unit.

According to the image processing device in such configuration, the process selection unit causes either the first image processor or the second image processor to perform arithmetic processing based on the numerical value of the element acquired by the element acquisition unit. In such manner, highly accurate image processing is performable.

A. First Embodiment

A1. Configuration of the First Embodiment

FIG. 1 is a diagram illustrating a configuration of a vehicle VW according to the present embodiment. The vehicle VW is capable of traveling by using ADAS (Advanced Driving Assistant System). As shown in FIG. 1, the vehicle VW is equipped with an image processing device 1. The image processing device 1 detects objects around the vehicle VW, and controls the vehicle VW based on the detection results. In the present embodiment, the image processing device 1 includes an imaging unit 10, a first element acquisition unit 20, a first image processor 30, a second image processor 40, a process selection unit 50, and a vehicle controller 60.

The imaging unit 10 images a target object around the vehicle VW and generates an image including the target object. The target objects include other vehicles, people, animals, traffic lights, buildings, and the like. The imaging unit 10 is electrically connected to the first image processor 30 and the second image processor 40, and transmits data of the generated image to the first image processor 30 and the second image processor 40. In the present embodiment, the imaging unit 10 is a camera. Note that, as the imaging unit 10, a configuration other than a camera can also be adoptable as long as it images the target objects around the vehicle VW and generates images.

The first element acquisition unit 20 acquires numerical values representing an intensity of an element of an environment around the vehicle VW. In the present embodiment, the element of the environment around the vehicle VW is brightness, and the first element acquisition unit 20 is an illuminance sensor. The illuminance sensor is arranged on the vehicle VW for receiving an external light incoming from a front field of the vehicle VW. The illuminance sensor acquires a numerical value representing the intensity of the received light. In the present embodiment, the unit of the numerical value is lux (lx). Note that the numerical value acquired by the element acquisition unit in the specification of the present disclosure means, for example, that the element acquisition unit detects a degree of intensity of the element and outputs a value according to the degree of such detection. The first element acquisition unit 20 transmits a signal indicating the acquired numerical value to the process selection unit 50.

Figure 2:
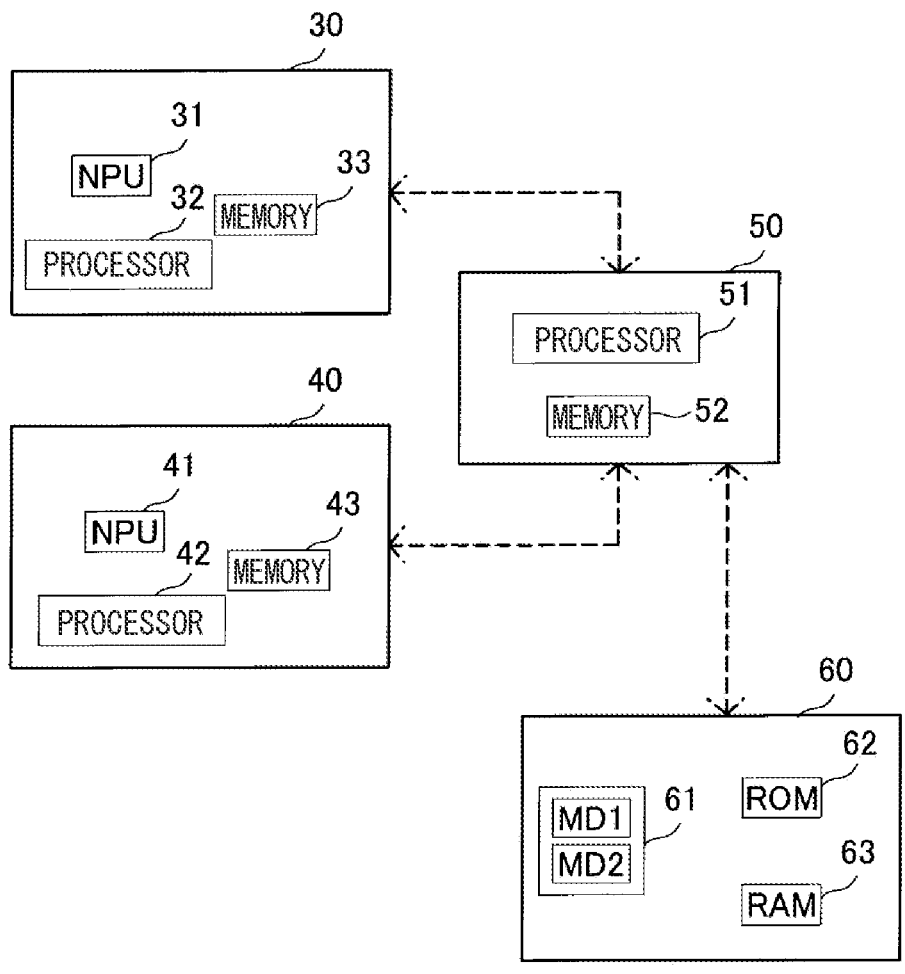
FIG. 2 is a block diagram of a configuration of a first image processor, a second image processor, a process selection unit, and a vehicle controller.

FIG. 2 is a block diagram of a configuration of the first image processor 30, the second image processor 40, the process selection unit 50, and the vehicle controller 60. The first image processor 30 can perform arithmetic processing on the image generated by the imaging unit 10 using a first neural network model. The first image processor 30 transmits data acquired by the arithmetic processing to the process selection unit 50. In the present embodiment, the first neural network model is a CNN (Convolutional neural network). The first image processor 30 includes an NPU (Neural Processor) 31, a processor 32, and a memory 33. The NPU 31 performs arithmetic processing using CNN. The processor 32 performs overall control of the NPU 31. The memory 33 stores results acquired by arithmetic processing.

The second image processor 40 can perform arithmetic processing on the image generated by the imaging unit 10 using a second neural network model. The second image processor 40 transmits data acquired by the arithmetic processing to the process selection unit 50. In the present embodiment, the second neural network model is a Transformer. The second image processor 40 includes an NPU 41, a processor 42, and a memory 43. The NPU 41 performs arithmetic processing using Transformer. The processor 42 performs overall control of the NPU 41. The memory 43 stores results acquired by the arithmetic processing.

The process selection unit 50 selects an image processor to perform arithmetic processing on the image, from among the two image processors, i.e., from the first image processor 30 and the second image processor 40. Specifically, the process selection unit 50 selects an image processor to perform arithmetic processing on the image based on a numerical value representing the intensity of the element acquired by the first element acquisition unit 20. Further, the process selection unit 50 transmits data resulting from the arithmetic processing of the selected image processor to the vehicle controller 60. In the present embodiment, the process selection unit 50 selects an image processor based on a numerical value representing the intensity of light received by the illuminance sensor. In the present embodiment, the process selection unit 50 includes a processor 51 and a memory 52. The processor 51 selects an image processor. The memory 52 stores, in a chronological order, (a) the image processor selected by the process selection unit 50 and (b) data as a result of arithmetic processing by the selected image processor.

The vehicle controller 60 controls the vehicle VW based on the data acquired by the arithmetic processing of the image processor selected by the process selection unit 50. For example, when the data indicates that another vehicle is included in the image, the vehicle controller 60 can actuate a brake (not shown) of the vehicle VW to stop the vehicle VW. The vehicle controller 60 is capable of transmitting and receiving signals to and from the process selection unit 50. The vehicle controller 60 includes a processor 61, a ROM 62, and a RAM 63. The processor 61 executes various programs by loading the various programs stored in the ROM 62 onto the RAM 63.

In the present embodiment, the vehicle controller 60 provides a first mode MD1 and a second mode MD2. The first mode MD1 is a mode in which control is performed based on the image processor selected by the process selection unit 50. The second mode MD2 is a mode in which control of the vehicle VW is performed (i) not based on the image processor selected by the process selection unit 50 (ii) but based on the data of the arithmetic processing output by the first image processor 30. The vehicle controller 60 performs control of the vehicle VW in the second mode MD2 while the image processor is not selected by the process selection unit 50.

Further, in the present embodiment, while the vehicle controller 60 is operating in the second mode MD2, the arithmetic processing is being performed by both of the first image processor 30 and the second image processor 40. Then, in the first mode MD1, the vehicle controller 60 performs control of the vehicle VW based on data of the result of the arithmetic processing output by the selected image processor, selected from among the first image processor 30 and the second image processor 40 by the process selection unit 50.

A2. Characteristics of the First Image Processor 30 and the Second Image Processor 40

Figure 3:
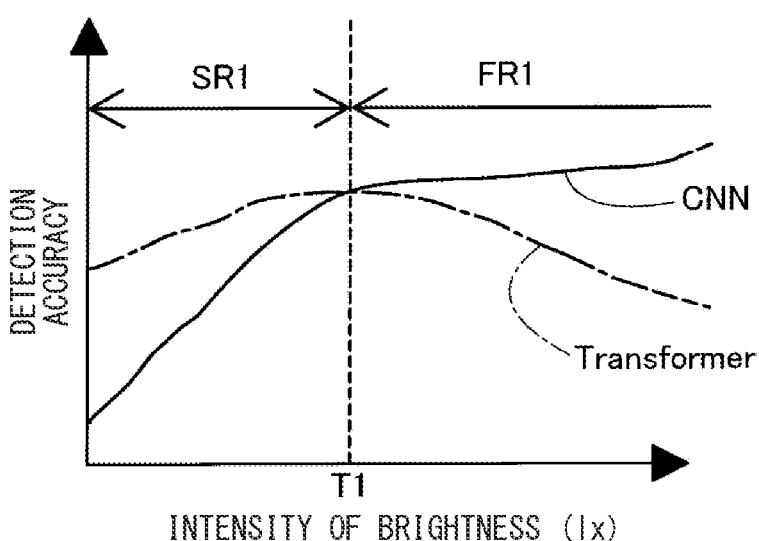
FIG. 3 is a diagram of a detection accuracy of each of the first image processor and the second image processor with respect to brightness.

FIG. 3 is a diagram of the detection accuracy of each of the first image processor 30 and the second image processor 40 with respect to brightness. In FIG. 3, the intensity of brightness is shown on the horizontal axis, and the detection accuracy of the image processor is shown on the vertical axis. The detection accuracy in the specification of the present disclosure refers to the percentage of correct answers when an image processor performs arithmetic processing on an image prepared in advance. The detection accuracy is tested in advance for each element by an operator. In the present embodiment, the detection accuracy is shown as a case when the image processor performs arithmetic processing on a plurality of images of different brightness. Hereinafter, the detection accuracy of the image processor will be expressed as "accuracy."

As shown in FIG. 3, in a first range FR1 regarding the intensity of brightness, the accuracy of the first image processor 30 using CNN is higher than the accuracy of the second image processor 40 using Transformer. Further, in a second range SR1 regarding the intensity, the accuracy of the second image processor 40 is higher than the accuracy of the first image processor 30. In FIG. 3, a line representing the accuracy of the first image processor 30 is drawn as a solid line, and a line representing the accuracy of the second image processor 40 is drawn as a one-dot chain line. The same applies to FIG. 6, which will be explained later. In the present embodiment, the smallest numerical value in the first range FR1 is larger than a first threshold value T1. Further, the largest numerical value in the second range SR1 is smaller than the first threshold value T1.

The first threshold value T1 in the present embodiment is an intensity of brightness of the image data regarding which (a) the accuracy of the arithmetic processing performed by the first image processor 30 and (b) the accuracy of the arithmetic processing performed by the second image processor 40 are equal with each other when performing the arithmetic processing on a plurality of images prepared by an operator and having different brightnesses.

Note that the first threshold value T1 may also be determined by a method other than the above-described method. For example, among the intensities of brightness at entrances of any plurality of tunnels measured by the operator, the highest intensity may be set as the first threshold value T1. The brightness at the entrances of any plurality of tunnels is measured by an operator at a distance of 1 meter inside from the entrance of each tunnel. Note that the brightness may be measured at a plurality of locations in each of any plurality of tunnels, and the highest intensity among them may be set as the first threshold value T1.

In addition, it is generally known that CNN has a property that, during the daytime on a sunny day, accuracy changes with respect to changes in brightness over time are smaller than those of Transformer. The brightness during the daytime on a sunny day belongs to the first range FR1 in FIG. 3. On the other hand, it is also known that CNN has a property that, in a rainy day, in a tunnel or the like where the intensity of brightness outside of the vehicle VW is lower than the daytime on a sunny day, accuracy of brightness detection using CNN is lower than accuracy of brightness detection using Transformer. The brightness in a situation where the intensity is lower than that in a clear day belongs to the second range SR1 in FIG. 3.

A3. Selection of the First Image Processor 30 or the Second Image Processor 40 by the Process Selection Unit 50

Figure 4:
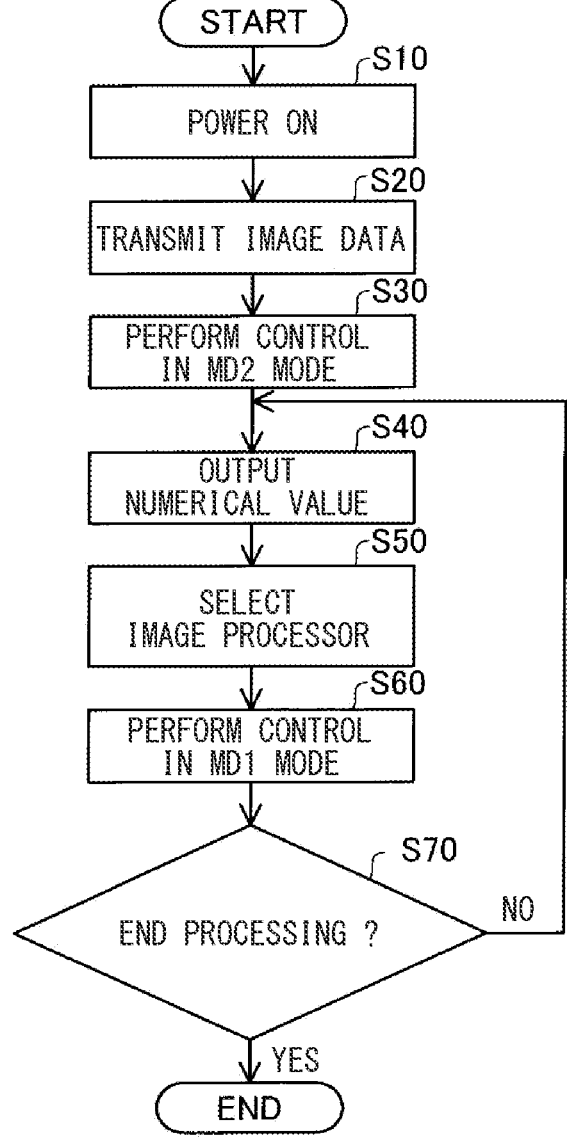
FIG. 4 is a process diagram of an example of selection of an image processor by an image processing device.

FIG. 4 is a process diagram of an example of selection of an image processor by the image processing device 1. In step S10 of FIG. 4, after the power of the vehicle VW is turned on by a user, the vehicle controller 60 starts to perform control of the vehicle VW in the second mode MD2. After a lapse of a predetermined time from the start of the second mode MD2, the process proceeds to step S20. The predetermined time can be set arbitrarily, such as 5 seconds, 10 seconds, 1 minute, or the like.

In step S20, image data generated by the imaging unit 10 is transmitted to the first image processor 30 and the second image processor 40. In step S30, the first image processor 30 and the second image processor 40 perform arithmetic processing on the image data. Then, the first image processor 30 and the second image processor 40 transmit data resulting from the arithmetic processing to the process selection unit 50. The process selection unit 50 transmits data resulting from the arithmetic processing performed by the first image processor 30 to the vehicle controller 60. Then, the vehicle VW is controlled by the vehicle controller 60 based on the result of the arithmetic processing output by the first image processor 30. Note that from then on, (a) image generation by the imaging unit 10 and (b) arithmetic processing and output of the result therefrom by the first image processor 30 and the second image processor 40 are performed every second by the end of processing.

In step S40, the illuminance sensor acquires a numerical value corresponding to the intensity of the received light, and transmits data of the numerical value to the process selection unit 50. Note that the process of step S40 may be performed before the process of step S20. In step S50, the process selection unit 50 selects an image processor based on a numerical value representing the intensity of light received by the illuminance sensor. Specifically, when the numerical value is equal to or greater than the first threshold value T1, the process selection unit 50 selects the first image processor 30. When the numerical value is smaller than the first threshold value T1, the process selection unit 50 selects the second image processor 40. In the present embodiment, the process selection unit 50 selects the first image processor 30, and transmits, to the vehicle controller 60, the data of the result of the arithmetic processing received from the first image processor 30 in step S30.

In step S60, the vehicle controller 60 controls the vehicle VW in the first mode MD1. In the present embodiment, the vehicle controller 60 performs control of the vehicle VW based on data from the arithmetic processing by the first image processor 30. In step S70, the vehicle controller 60 determines whether or not to end the processing. If the user stops the vehicle VW and turns off the power of the vehicle VW within a predetermined time from execution of the process in step S60, the process ends. In case that a travel of the vehicle VW is continuing after a lapse of a predetermined time from performing the process in step S60, the vehicle controller 60 determines that the process is not going to end, the process returns to step S40 again in a state in which the first mode MD1 is being performed.

In the present embodiment, the process selection unit 50 causes either the first image processor 30 or the second image processor 40 to perform arithmetic processing based on the numerical value of the element acquired by the first element acquisition unit 20. In such manner, highly accurate image processing is performable.

In the present embodiment, the image processor is selected by the process selection unit 50 based on a numerical value representing the intensity of light received by the illuminance sensor. Highly accurate image processing is performable by selecting an image processor based on the brightness that is considered to highly frequently influencing the accuracy of arithmetic processing by the image processor.

It is considered that the vehicle VW most often travels during the daytime on sunny days. In the present embodiment, as shown in FIG. 3, in the first range FR1 regarding intensity of brightness, the accuracy of the first image processor 30 using CNN is higher than the accuracy of the second image processor 40 using Transformer. Then, while the second mode MD2 is being performed in which the image processor is not selected by the process selection unit 50, the vehicle VW is controlled based on the data from the arithmetic processing of the first image processor 30. In such manner, in highly-likely travel environment, i.e., in the daytime on a sunny day, during which selection of an image processor by the process selection unit 50 is not being performed, deterioration of the accuracy of arithmetic processing corresponding to the intensity of brightness is reducible.

Further, in the second mode MD2, since the arithmetic processing is performed by both of the first image processor 30 and the second image processor 40, when the control is switched from the second mode MD2 to the first mode MD1, the data resulting from the arithmetic processing has already been prepared. Therefore, the vehicle controller 60 can quickly perform control of the vehicle VW based on the data.

In addition, it is generally known that CNN is affected by noise and become less accurate when noise increases during A/D conversion from an input of an analog signal to a digital signal. In situations where the surroundings of the vehicle VW become dark, such as when the vehicle VW enters a tunnel, a building, or the like, it is highly likely that the noise during A/D conversion increases. Therefore, when the numerical value acquired by the first element acquisition unit 20 belongs to the second range SR1 smaller than the first threshold value T1, highly accurate arithmetic processing is performable due to the selection of the second image processor 40 using Transformer by the process selection unit 50.

B. Second Embodiment

An image processing device 1B of the second embodiment has difference from the first embodiment in that (a) a first image processor 30B is an image processor using Transformer, and a second image processor 40B is an image processor using CNN, (b) the process selection unit 50 selects an image processor based on an intensity of rain, (c) the element acquisition unit is implemented as follows, and (d) the processing in step S30 in FIG. 4 is performed as follows. Other configurations are the same as those in the first embodiment, regarding which the same reference numerals are given and detailed explanations are omitted.

Figure 5:
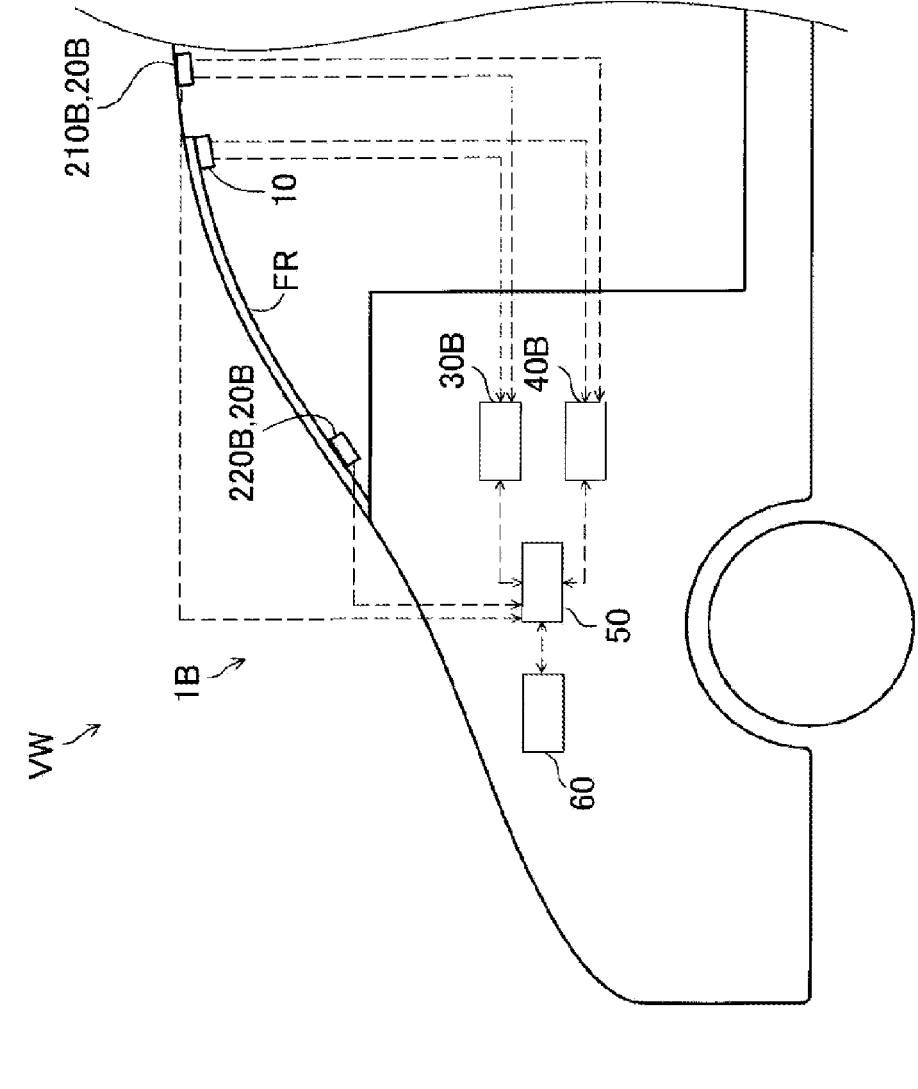
FIG. 5 is a diagram of a vehicle according to a second embodiment.

FIG. 5 is a diagram of the vehicle VW according to the second embodiment. First, in the second embodiment, as described above, the first image processor 30B using Transformer and the second image processor 40B using CNN perform arithmetic processing on an image.

A second element acquisition unit 20B of the second embodiment acquires a numerical value representing the intensity of rain in the environment around the vehicle VW. The second element acquisition unit 20B includes a net information unit 210B and a rainfall detection unit 220B. The net information unit 210B uses signals from GPS satellites to acquire a current location. Then, an amount of precipitation at the current location is acquired through the network. Specifically, the net information unit 210B acquires the amount of precipitation that has reached the horizontal plane of the earth's surface at the present time during a certain period of time. The net information unit 210B converts the acquired amount of precipitation into an amount of rain that falls per square meter per second, and acquires it as a numerical value representing the intensity of the rain. The numerical value acquired by the net information unit 210B is expressed as a first numerical value FN. The first numerical value FN is output to the process selection unit 50.

The rainfall detection unit 220B directly detects rain around the vehicle VW. The rainfall detection unit 220B is installed on a windshield FR of the vehicle VW. In the present embodiment, the rainfall detection unit 220B includes a rain sensor. The rain sensor detects rain that has come into contact with the windshield FR using a combination of an infrared LED and a Si photodiode. Specifically, infrared light is irradiated from the infrared LED toward the windshield FR. When there are no water droplets attached to the windshield FR, the infrared light is reflected by the windshield FR and enters the Si photodiode. On the other hand, when there are water droplets attached to the windshield FR, the infrared light is not reflected by the windshield FR and passes through the water droplets. The amount of rain is measured by the amount of reflected light incident on the Si photodiode. The rainfall detection unit 220B converts the amount of rain measured by the rain sensor into the amount of rain that falls per square meter per second, and outputs it as a numerical value representing the intensity of the rain. The numerical value acquired by the rainfall detection unit 220B is expressed as a second numerical value SN. The second numerical value SN is output to the process selection unit 50.

The process selection unit 50 selects an image processor by using a larger one of the first numerical value FN and the second numerical value SN as a numerical value representing the intensity of rain acquired by the second element acquisition unit 20B.

Figure 6:
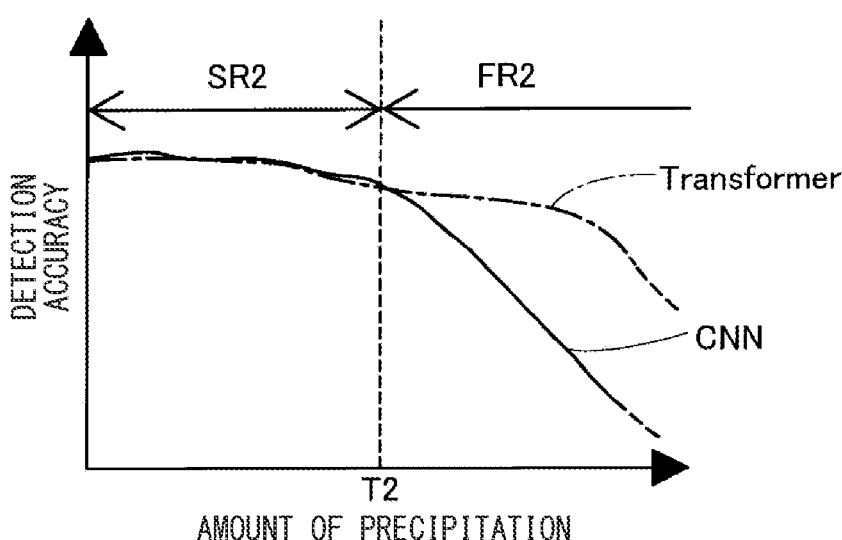
FIG. 6 is a diagram of an accuracy of an image processor with respect to precipitation.

FIG. 6 is a diagram of the accuracy of the image processor with respect to rainfall. The horizontal axis represents the amount of rain that falls per square meter per second, and the vertical axis represents the accuracy of the image processor. In general, it is known that the accuracy of arithmetic processing in CNN lowers due to rain, snow, dust, and the like recorded in the generated data. As shown in FIG. 6, in a first range FR2, the accuracy of the first image processor 30B using Transformer is higher than the accuracy of the second image processor 40B using CNN. Further, in a second range SR2, the accuracy of the second image processor 40B using CNN is higher than the accuracy of the first image processor 30B using Transformer. In the second embodiment, the smallest numerical value in the first range FR2 is larger than a second threshold T2. Further, the largest numerical value in the second range SR2 is smaller than the second threshold T2.

In the second embodiment, the second threshold value T2 is determined as a rainfall, regarding which the accuracy of the first image processor 30B and the accuracy of the second image processor 40B match with each other based on an examination using a plurality of images of rainy day, having respectively different rainfalls per square meter per second. The image is any image prepared by the operator. Note that the second threshold T2 may be an arbitrary value determined by the operator. For example, the amount of rain in an image of 1 square meter, at which the area occupied by raindrops is equal to or larger than a predetermined area may be set as the second threshold T2.

Figure 7:
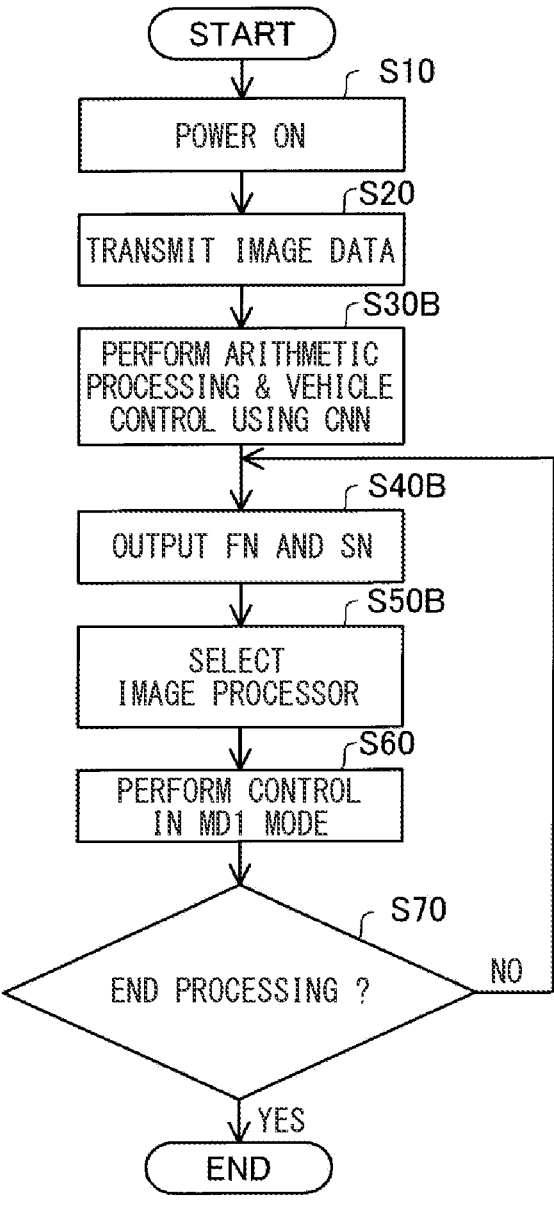
FIG. 7 is a process diagram of an example of selection of an image processor by an image processing device of the second embodiment.

FIG. 7 is a process diagram of an example of selection of an image processor by the image processing device 1B of the second embodiment. The processes in step S10 and step S20 are the same as those in FIG. 4, thereby the details are omitted. In step S30B of FIG. 7, the vehicle controller 60 controls the vehicle VW based on the data resulting from the arithmetic processing performed by the second image processor 40. That is, the vehicle VW is controlled based on data resulting from the arithmetic processing using CNN.

In step S40B, the rain sensor outputs the first numerical value FN, and the rainfall detection unit 220B outputs the second numerical value SN. In step S50B, the process selection unit 50 selects an image processor using the larger value among the first numerical value FN and the second numerical value SN. Specifically, the process selection unit 50 selects the first image processor 30B when the numerical value to be used is equal to or greater than the second threshold T2. On the other hand, if the numerical value to be used is smaller than the second threshold T2, the second image processor 40B is selected. The processing after step S60 is the same as that in FIG. 4.

In the second embodiment, the process selection unit 50 selects an image processor using the larger value of the first numerical value FN and the second numerical value SN. In such manner, highly accurate arithmetic processing according to the intensity of rain is performable.

C. Third Embodiment

An image processing device 1C of the third embodiment is different from the above-described embodiments in that (a) the image processing device 1C includes a first element acquisition unit 20 and a second element acquisition unit 20B, and (b) the selection of the image processor by the process selection unit 50 is performed as follows. Other configurations are the same as those in the first embodiment, regarding which the same reference numerals are given and detailed explanations are omitted.

In the third embodiment, the image processing device 1C includes the first element acquisition unit 20 and the second element acquisition unit 20B. The first element acquisition unit 20 acquires a numerical value representing the intensity of brightness of the environment around the vehicle VW. The second element acquisition unit 20B acquires a numerical value representing the intensity of rain. The first element acquisition unit 20 is an illuminance sensor and has the same configuration as the first embodiment. The second element acquisition unit 20B includes the net information unit 210B and the rainfall detection unit 220B. The net information unit 210B and the rainfall detection unit 220B have the same configuration as in the second embodiment.

In the third embodiment, the first image processor 30 is an image processor using CNN, and the second image processor 40 is an image processor using Transformer. In the third embodiment, the accuracy of the first image processor 30 is higher than the accuracy of the second image processor 40 in the first range FR1 regarding the intensity of brightness shown in FIG. 3. Further, in the second range SR1, the accuracy of the second image processor 40 is higher than the accuracy of the first image processor 30. On the other hand, in the first range FR2 of the intensity of rain shown in FIG. 6, the accuracy of the second image processor 40 is higher than the accuracy of the first image processor 30. Further, in the second range SR2, the accuracy of the first image processor 30 is higher than the accuracy of the second image processor 40.

Figure 8:
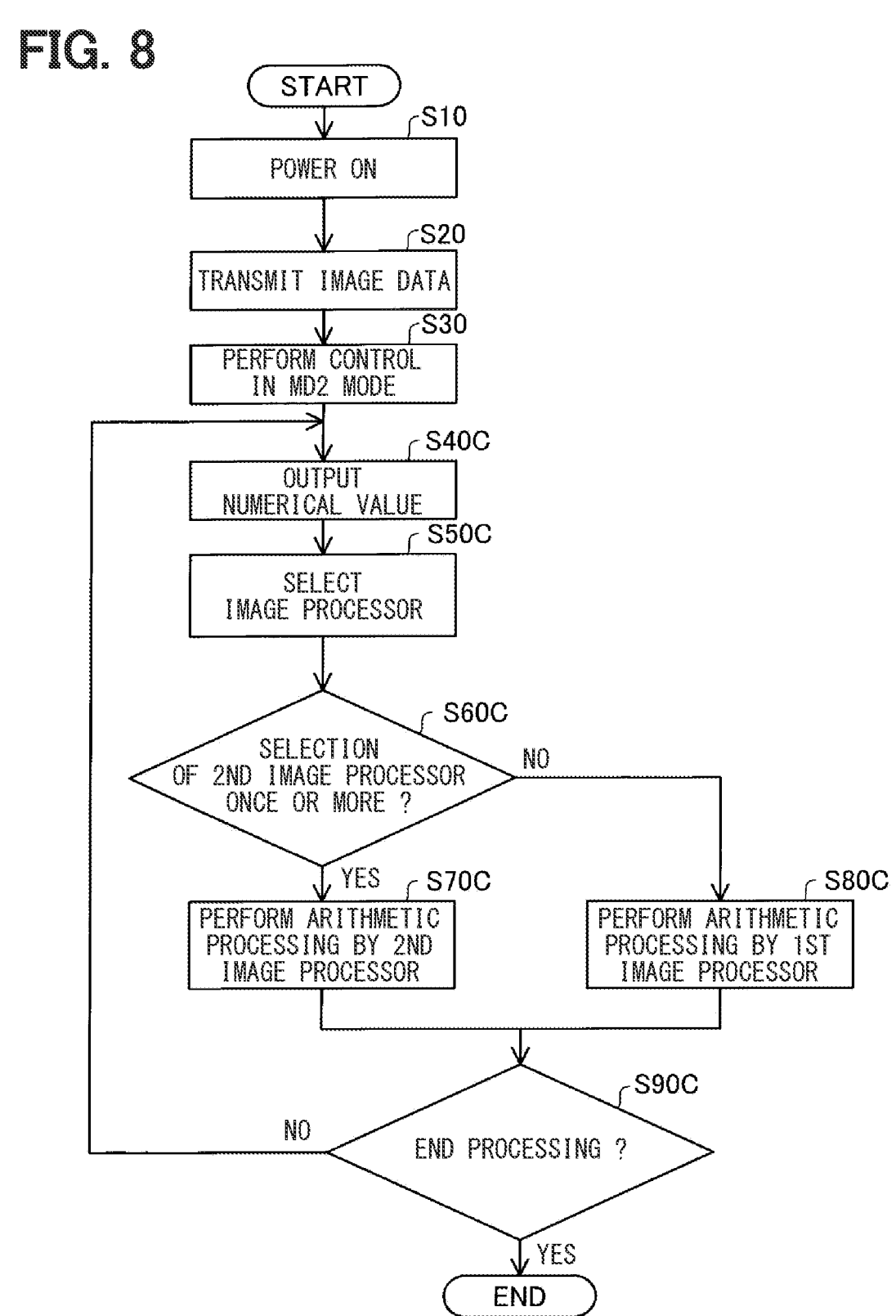
FIG. 8 is a process diagram of an example of selection of an image processor by the image processing device of a third embodiment.

FIG. 8 is a process diagram of an example of selection of an image processor by the image processing device 1C of the third embodiment. The processing from step S10 to step S30 is the same as that in FIG. 3, thereby the explanation is omitted. In step S40C, each of the first element acquisition unit 20 and the second element acquisition unit 20B outputs a numerical value representing the intensity of the element. In the third embodiment, the net information unit 210B and the rainfall detection unit 220B are electrically connected, and the larger value of the first numerical value FN and the second numerical value SN is output from the second element acquisition unit 20B.

In step S50C, the process selection unit 50 selects an image processor based on the numerical value representing the intensity of the element acquired by each of the first element acquisition unit 20 and the second element acquisition unit 20B. Selection of an image processor based on the numerical value acquired by the first element acquisition unit 20 is performed as the same process as shown in FIG. 4. Selection of an image processor based on the numerical value acquired by the second element acquisition unit 20B is performed as the same process as shown in FIG. 7.

In step 60C, the process selection unit 50 determines whether the second image processor 40 has been selected by a predetermined number of times or more. In step S50C, when the second image processor 40 is selected based on the numerical value acquired by the first element acquisition unit 20, it is expressed as "the second image processor 40 has been selected once." In step S50C, when the second image processor 40 is selected based on the numerical value acquired by the second element acquisition unit 20B, it is expressed as "the second image processor 40 has been selected once." In the third embodiment, the predetermined number of times is one. When the second image processor 40 is selected by the process selection unit 50 once or more, the process proceeds to step S70C. When the second image processor 40 is never selected by the process selection unit 50 and only the first image processor 30 is selected, the process proceeds to step S80C. Note that the predetermined number of times is determined by the operator and inputted to the process selection unit 50 in advance.

In step S70C, the vehicle controller 60 operates in the first mode MD1. In step S70C, the second image processor 40 performs arithmetic processing. In step S80C, the vehicle controller 60 operates in the first mode MD1. In step 80C, the first image processor 30 performs arithmetic processing. Thereafter, the process proceeds to step S90C. The process in step S90C is similar to the process in step S70 in FIG. 4.

In the third embodiment, the image processing device 1C can select an image processor based on a numerical value representing the intensity of one or more elements.

D. Fourth Embodiment

In the fourth embodiment, an image processing device 1D (a) including a third element acquisition unit 20D (not shown), which acquires a numerical value representing the intensity of an element of the environment around the vehicle VW based on an image acquired by the imaging unit 10, and (b) dispensing an illuminance sensor is different from the first embodiment. Other configurations are the same as those in the first embodiment, regarding which the same reference numerals are given and detailed explanations are omitted.

In the fourth embodiment, the imaging unit 10 transmits data of the generated image to the third element acquisition unit 20D. The third element acquisition unit 20D detects the brightness per unit pixel of the image data. Then, an average brightness of the image is calculated, a numerical value representing the intensity is acquired, and the numerical value is output to the process selection unit 50. The process selection unit 50 selects an image processor based on the numerical value acquired by the third element acquisition unit 20D using the same method as in the first embodiment.

In the fourth embodiment, it is possible to acquire the numerical value representing the intensity of the element of the environment around the vehicle VW using the image acquired by the imaging unit 10, and without using a device for acquiring the numerical value representing the intensity of the element.

E. Other Embodiments

E1: Other Embodiment 1

(1) In the first embodiment described above, the first element acquisition unit 20 acquires a numerical value representing the intensity of brightness. Further, in the second embodiment, the second element acquisition unit 20B acquires a numerical value representing the intensity of rain. Note that, for example, an element acquisition unit may also acquire a numerical value representing the degree of dust or snow attached to the windshield.

(2) In the embodiment described above, the smallest numerical value in the first range FR1 is greater than the first threshold value T1. Further, the largest numerical value in the second range SR1 is smaller than the first threshold value T1. Further, the smallest numerical value in the first range FR2 is larger than the second threshold T2. Further, the largest numerical value in the second range SR1 is smaller than the first threshold value T1. Note that, depending on the method of determining the first threshold value, the first threshold value may belong either to the first range or the second range. For example, if the highest intensity among the intensities of brightness regarding arbitrary plurality of tunnels measured by the operator is set as the first threshold value, the first threshold value may belong either to the first range or the second range. Similarly, depending on the method of determining the second threshold value, the second threshold value may belong either to the first range or the second range.

(3) In the embodiment described above, the process selection unit 50 selects an image processor based on whether the numerical value acquired by the element acquisition unit is equal to or greater than the first threshold value T1 or the second threshold value T2. Note that the process selection unit may select an image processor not based on the threshold value, for example, in an embodiment in which the threshold value belongs either to the first range or the second range. In such aspect, the process selection unit (a) may select the first image processor when the numerical value acquired by the element acquisition unit belongs to the first range, (b) may select the first image processor when the numerical value acquired by the element acquisition unit belongs to the second range, or (c) may select one of the first image processor or the second image processor, whichever is predetermined by the operator, when the numerical value does not belong to the first range nor the second range.

(4) In the first embodiment, after the user turns on the power of the vehicle VW in step S10 of FIG. 4, the vehicle controller 60 performs control of the vehicle VW in the second mode MD2. Note that the second mode may be performed at a timing other than when the vehicle is powered on. For example, the vehicle controller may perform control of the vehicle in the second mode after the start of the automatic driving, or the vehicle controller may perform control of the vehicle in the second mode after a lapse of a predetermined time from a start of travel of the vehicle.

(5) The image processing device may include, for example, a control unit that functions as a first image processor, a second image processor, and a process selection unit. In such aspect, the control unit includes an NPU, a processor, and a memory, and the NPU performs arithmetic processing using CNN and Transformer, and the process selection unit causes one of the first image processor and the second image processor to perform arithmetic processing. The processor performs overall control of the NPU. According to the image processing device provided in such form, since the first image processor, the second image processor, and the process selection unit are controlled by the same control unit, switching between the first image processor and the process selection unit is quickly performable by the process selection unit.

(6) In the embodiment described above, when the numerical value representing the intensity of light received by the illuminance sensor is equal to or greater than the first threshold value, the process selection unit 50 selects the first image processor 30. Note that when the numerical value is larger than the first threshold value, the process selection unit may select the first image processor, and when the numerical value is equal to or less than the first threshold value, the process selection unit may select the second image processor.

(7) In the embodiment described above, the vehicle VW is travelable by using an ADAS (Advanced Driving Assistant System). Note that, for example, the vehicle may be configured to be travelable by using AD (Autonomous Driving).

(8) In the first embodiment, when the vehicle controller 60 determines that the process is not going to end, the process returns to step S40 in FIG. 4. Note that the process may end when the vehicle controller determines that automatic driving is going to end. Further, after the process in step S60 of FIG. 4, the process may proceed to step S40. In such aspect, when the user ends the travel, the process ends regardless of which one of processes is being performed.

(9) In the first embodiment, after a lapse of a predetermined time from the start of the second mode MD2, the process proceeds to step S20. Note that, for example, the process may proceed to step S20 immediately after the start of the second mode, and then, after a lapse of a predetermined time, the process may proceed to step S60.

E2: Other Embodiment 2

(1) In the third embodiment described above, the image processing device 1B includes, as two element acquisition units, the first element acquisition unit 20 and the second element acquisition unit 20B. Note that, for example, the image processing device may include a plurality of element acquisition units other than two, such as three or five. In such aspect, the element acquisition unit each acquires a numerical value representing the intensity of one element among one or more elements such as rain, brightness, dust, and the like. Then, the process selection unit selects an image processor based on the numerical value of the element acquired by the plurality of element acquisition units.

(2) In the third embodiment described above, the predetermined number of times is one. Note that the operator can determine the predetermined number of times depending on the environment in which the vehicle travels and the type and number of elements. For example, in an embodiment in which the image processing device includes two element acquisition units, the second image processor may perform arithmetic processing in the first mode only when the second image processor is selected twice by the process selection unit. Further, for example, in an embodiment in which the image processing device includes five element acquisition units, when the second image processor is selected by the process selection unit once or more, the second image processor may perform arithmetic processing in the first mode, or, when the second image processor is selected by the process selection unit five times, the second image processor may perform arithmetic processing in the first mode.

E3: Other Embodiment 3

In the third embodiment described above, when the second image processor 40 has already been selected by a predetermined number of times or more, the second image processor 40 is selected by the process selection unit 50. Note that, for example, in an embodiment in which the image processing device includes a plurality of element acquisition units, one of which is an illuminance sensor, the process selection unit may select an image processor based only on the numerical value acquired by the illuminance sensor.

E4: Other Embodiment 4

(1) In the embodiment described above, the image processing device 1 includes the vehicle controller 60. Note that, for example, in an embodiment in which the process selection unit performs control of the vehicle, the image processing device may have the vehicle controller dispensed therefrom.

(2) In the embodiment described above, the vehicle controller 60 has the first mode MD1 and the second mode MD2. Note that, for example, in a mode in which the vehicle travels by a driving of the user until the numerical value is acquired by the element acquisition unit, the vehicle controller may only have the first mode without having the second mode, and, while the selection of the image processor is not being performed by the process selection unit, the control by the vehicle controller may be not performed. Further, in a mode in which the process selection unit selects the image processor immediately after the power on of the vehicle, the second mode may be not performed.

E5: Other Embodiment 5

(1) In the embodiment described above, while the second mode MD2 is being performed, the arithmetic processing by the first image processor 30 and the second image processor 40 is performed, and, in the first mode MD1, the vehicle VW is controlled based on the data of the arithmetic processing output by one of the first image processor 30 and the second image processor 40. Note that, for example, in a mode in which the vehicle controller does not have the second mode, while selection of the image processor is not being performed by the process selection unit, the arithmetic processing may be performed (a) only by the first image processor, or (b) by none of the first image processor and the second image processor. Further, for example, in a mode in which the vehicle controller does not have the second mode, the process selection unit that has received a signal indicating the numerical value acquired by the element acquisition unit may select an image processor, and then the selected image processor may perform the arithmetic processing by receiving the image data from the imaging unit.

E6: Other Embodiment 6

(1) In the fourth embodiment described above, the third element acquisition unit 20D acquires a numerical value representing the intensity of the element based on the image generated by the imaging unit 10. Note that, for example, the element acquisition unit may include an illuminance sensor and an illuminance processor that acquires a numerical value representing the intensity of the element based on the image generated by the imaging unit, and may use the illuminance processor and the illuminance sensor together to acquire a numerical value representing the intensity of the element. In such aspect, the image processor may be selected by the process selection unit based on a smaller numerical value among the numerical values acquired by each of the illuminance processor and the illuminance sensor. Further, in such aspect, when an abnormality occurs in the illuminance sensor, the process selection unit may select the image processor as a substitute for the illuminance sensor by using the numerical value acquired by the illuminance processor.

(2) The element acquisition unit may acquire a numerical value representing the intensity of rain by using the net information unit, the rainfall detection unit, and the imaging unit together.

E7: Other Embodiment 7

(1) In the second embodiment described above, the second element acquisition unit 20B includes the net information unit 210B and the rainfall detection unit 220B. Note that, for example, the element acquisition unit may include only one of the net information unit and the rainfall detection unit.

(2) In the second embodiment described above, the net information unit 210B and the rainfall detection unit 220B output the amount of rain that falls per square meter in one second. Note that, for example, the net information unit and the rainfall detection unit may output the amount of rain that falls per square meter in one minute.

(3) In the second embodiment described above, the process selection unit 50 uses the larger value of the first numerical value FN and the second numerical value SN as a numerical value representing the intensity of rain acquired by the second element acquisition unit 20B, for selecting an image processor. Note that, for example, the second element acquisition unit may transmit a signal indicating the larger one of the first numerical value and the second numerical value to the process selection unit.

Further, for example, when the net information unit and the rainfall detection unit each acquire a numerical value equal to or greater than a predetermined threshold value, they may transmit, to the process selection unit, (a) a signal indicating that rain has been detected and (b) a signal indicating the numerical value, and the process selection unit may select the image processor based on the received numerical value. In such aspect, when one of the net information unit and the rainfall detection unit detects rain, selection of an image processor by the process selection unit is performable. When it is raining in an environment in which the vehicle is traveling, the selection of the image processor is quickly performable, thereby making it possible to perform highly accurate arithmetic processing.

E8: Other Embodiment 8

In the first embodiment described above, the first threshold value T1 is an intensity of brightness of the image data regarding which (a) the accuracy of the arithmetic processing performed by the first image processor 30 and (b) the accuracy of the arithmetic processing performed by the second image processor 40 are equal with each other when performing the arithmetic processing on a plurality of images prepared by the operator and having different brightnesses. For example, the first range of brightness may refer to a range that is higher than the intensity of brightness inside the tunnel. In the specification of the present disclosure, the intensity of brightness inside the tunnel refers to a range of brightness that is higher than either of (a) an average road surface brightness by the basic lighting of the tunnel, as defined in the Road Lighting Facility Installation Standards of the Ministry of Land, Infrastructure, Transport and Tourism, or (b) a road surface brightness of each part of an entrance lighting, as defined in the Road Lighting Facility Installation Standards of the Ministry of Land, Infrastructure, Transport and Tourism.

The present disclosure should not be limited to the embodiments or modifications described above, and various other embodiments may be implemented without departing from the scope of the present disclosure. For example, the technical features in each embodiment and modification example corresponding to the technical features in the form described in the summary may be appropriately used, combined or replaced in order (a) to solve some or all of the above-described problems, or (b) to provide a part or all of the above-described effects. Also, some of the technical features may be omitted as appropriate when such technical features are not described as essential part of the disclosure in the specification.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits. In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause SUBJECT MATTER to perform functions" should be understood as "only the circuit can cause SUBJECT MATTER to perform all the functions". Further, the phrase "at least one of a circuit and a processor is configured to cause SUBJECT MATTER to perform functions" should be understood as "only the processor can cause SUBJECT MATTER to perform all the functions". Moreover, the phrase "at least one of a circuit and a processor is configured to cause SUBJECT MATTER to perform functions" should be understood as "the circuit can cause SUBJECT MATTER to perform at least one of the functions and the processor can cause SUBJECT MATTER to perform the remaining functions". In the last example, if SUBJECT MATTER performs functions A to C, for example, the functions A and B among the functions A to C may be implemented by a circuit, while the remaining function C may be implemented by a processor."

What is claimed is:

1. An image processing device for a vehicle, comprising:

an imaging unit configured to image a target object and generate an image including the target object;

at least one element acquisition unit configured to acquire a numerical value representing an intensity of at least one element of an environment around the vehicle;

a first image processor configured to perform arithmetic processing on the image using a first neural network model;

a second image processor configured to perform arithmetic processing on the image using a second neural network model; and a process selection unit configured to select one of the first image processor and the second image processor, which performs the arithmetic processing on the image, wherein in a first range of the intensity of the at least one element, an accuracy of the first image processor is higher than an accuracy of the second image processor, in a second range of the intensity of the at least one element, which is lower than the first range in the intensity, the accuracy of the second image processor is higher than the accuracy of the first image processor, and the process selection unit is configured to select one of the first image processor and the second image processor, which performs the arithmetic processing, based on the numerical value representing the intensity of the at least one element acquired by the at least one element acquisition unit.

2. The image processing device of claim 1, wherein in a first range of the intensity of an other element, which is other than the at least one element, the accuracy of the second image processor is higher than the accuracy of the first image processor, and in a second range of the intensity of the other element, which is lower than the first range in the intensity, the accuracy of the first image processor is higher than the accuracy of the second image processor.

3. The image processing device of claim 1, wherein the at least one element is brightness, in the first range of the brightness, an accuracy of the arithmetic processing of the first image processor is higher than an accuracy of the arithmetic processing of the second image processor, and in the second range of the brightness, the accuracy of the arithmetic processing of the second image processor is higher than the accuracy of the arithmetic processing of the first image processor.

4. The image processing device of claim 1, further comprising:

a vehicle controller configured to control the vehicle based on data acquired by the arithmetic processing, wherein the vehicle controller has a first mode to perform control of the vehicle based on the one of the first image processor and the second image processor selected by the process selection unit, and a second mode to perform control of the vehicle based on data of the arithmetic processing output by the first image processor, regardless of the one of the first image processor and the second image processor selected by the process selection unit, and the vehicle controller is configured to perform the control of the vehicle in the second mode in a period, in which the process selection unit does not perform selection of one of the first image processor and the second image processor.

5. The image processing device of claim 4, wherein in a period, in which the vehicle controller performs the control of the vehicle in the second mode, the first image processor is configured to perform the arithmetic processing, and the second image processor is configured to perform the arithmetic processing, and the vehicle controller is configured to perform, in the first mode, the control of the vehicle based on data of the arithmetic processing output by the one of the first image processor and the second image processor selected by the process selection unit.

6. The image processing device of claim 1, wherein the element acquisition unit is configured to acquire the numerical value representing the intensity of the element of the environment around the vehicle based on the image generated by the imaging unit.

7. The image processing device of claim 1, wherein the at least one element acquisition unit includes an element acquisition unit, the element acquisition unit includes a net information unit configured to acquire a first numerical value as a numerical value representing an intensity of rain through a network, and a detection unit configured to acquire a second numerical value as a numerical value representing the intensity of the rain by directly detecting rain around the vehicle, the element acquisition unit is configured to output the first numerical value and the second numerical value, and the process selection unit is configured to select one of the first image processor and the second image processor by using a larger one of the first numerical value and the second numerical value as a numerical value representing the intensity of the rain acquired by the element acquisition unit.

8. The image processing device of claim 1, wherein the at least one element is brightness, and in a first range of the brightness, the brightness is higher than a numerical value representing the intensity of brightness inside a tunnel.

9. An image processing device for a vehicle, comprising:

a first image processor configured to perform arithmetic processing on an image using a first neural network model;

a second image processor configured to perform arithmetic processing on the image using a second neural network model; and at least one of (i) a circuit and (ii) a processor having a memory storing computer program code, wherein the at least one of the circuit and the processor having the memory is configured to cause the image processing device to:

generate an image including a target object;

acquire a numerical value representing an intensity of at least one element of an environment around the vehicle;

select one of the first image processor and the second image processor, which performs the arithmetic processing, based on the numerical value representing the intensity of the at least one element, wherein in a first range of the intensity of the at least one element, an accuracy of the first image processor is higher than an accuracy of the second image processor, and in a second range of the intensity of the at least one element, which is lower than the first range in the intensity, the accuracy of the second image processor is higher than the accuracy of the first image processor.

* * * * *